H. F. ROACH.
SWITCH FROG.
APPLICATION FILED APR. 2, 1908.
902,451.
Patented Oct. 27, 1908.
6 SHEETS—SHEET 5.
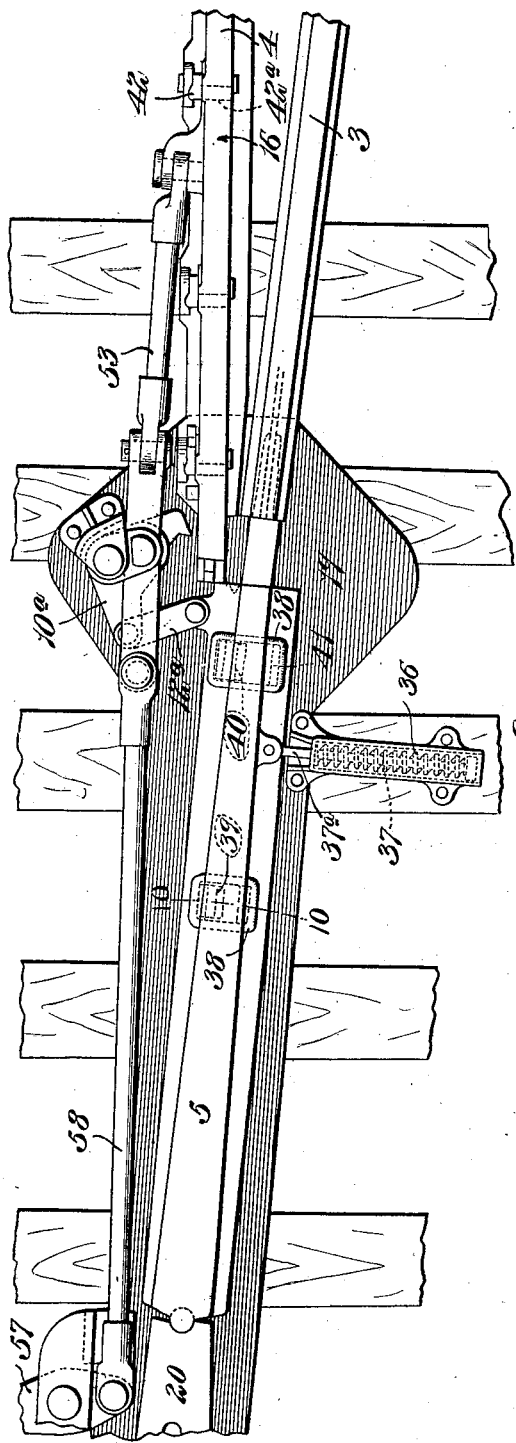
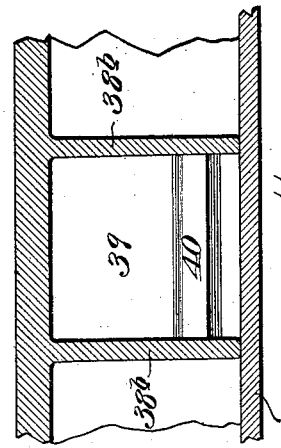
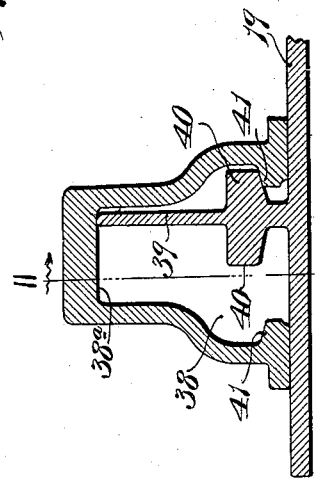
Inventor,
Harry F. Roach.
by Bakewell & Cornwall
Attys.
Witnesses:
George Ladson
Nell L. Church

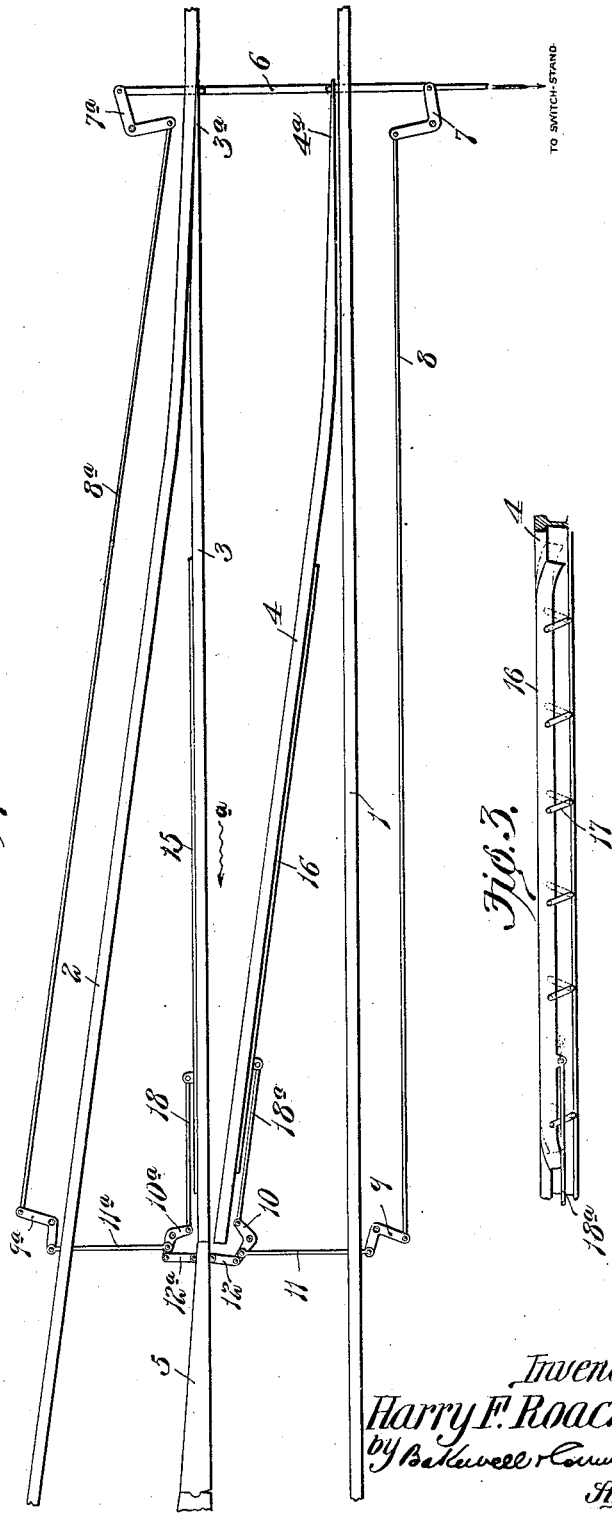

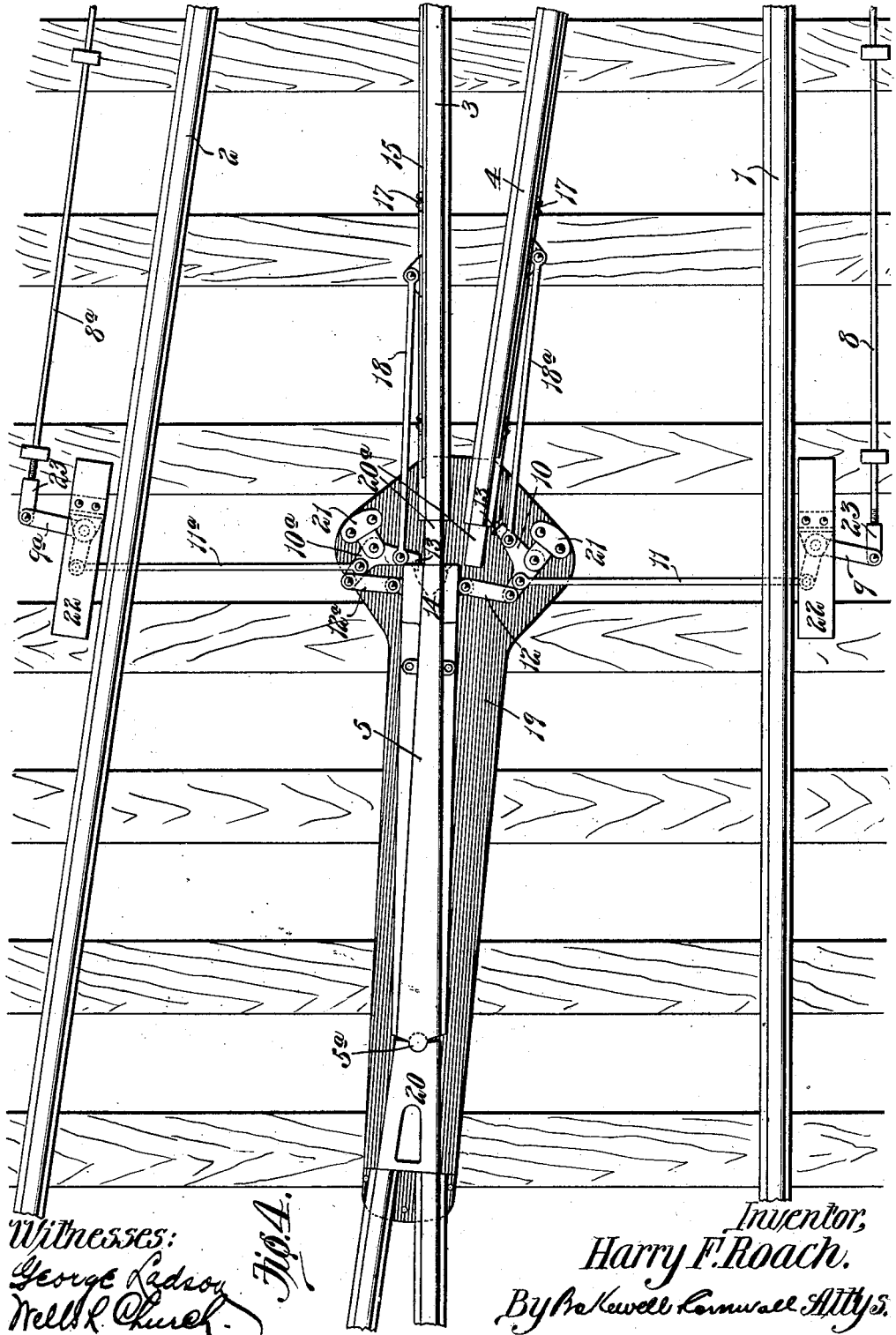

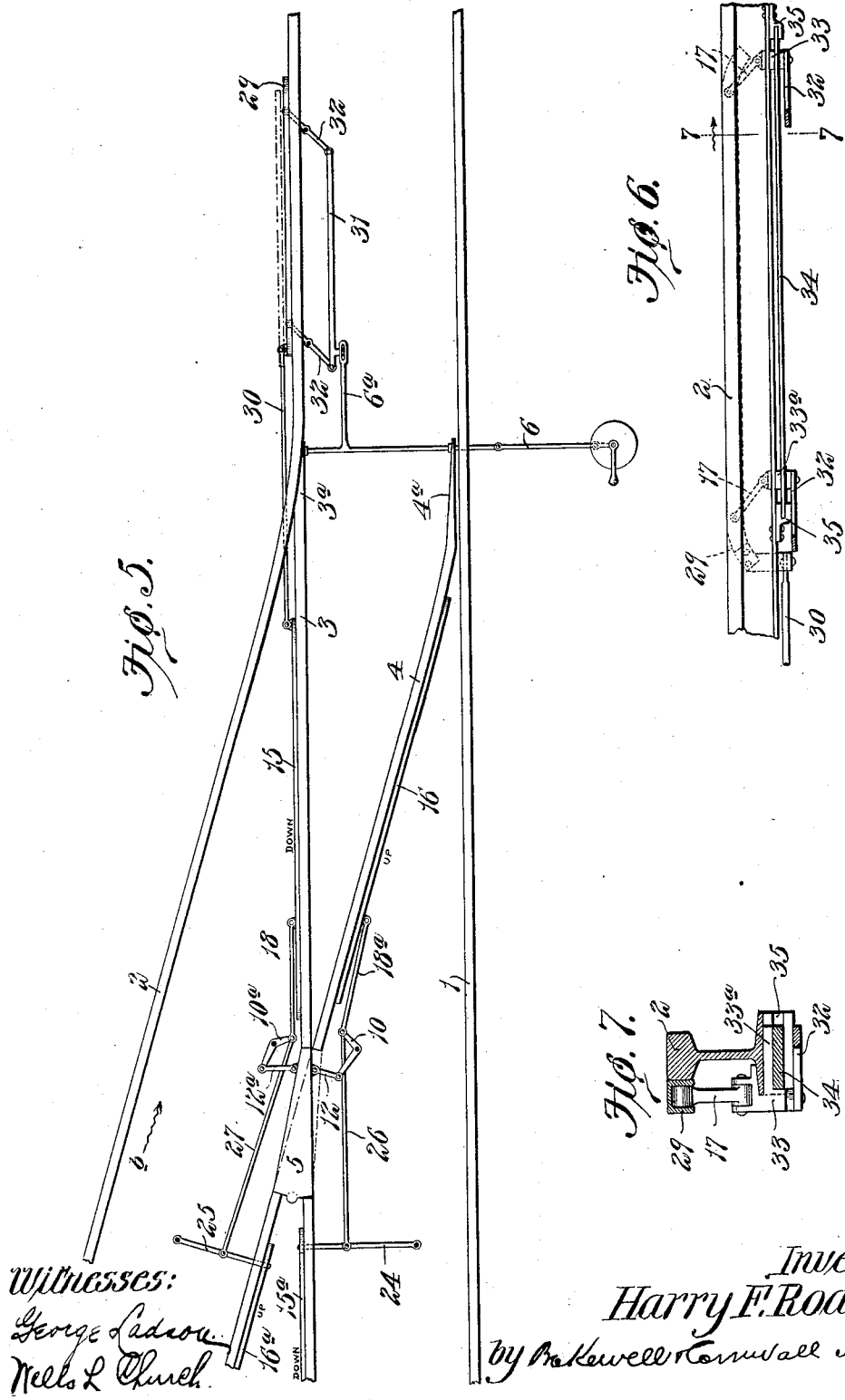

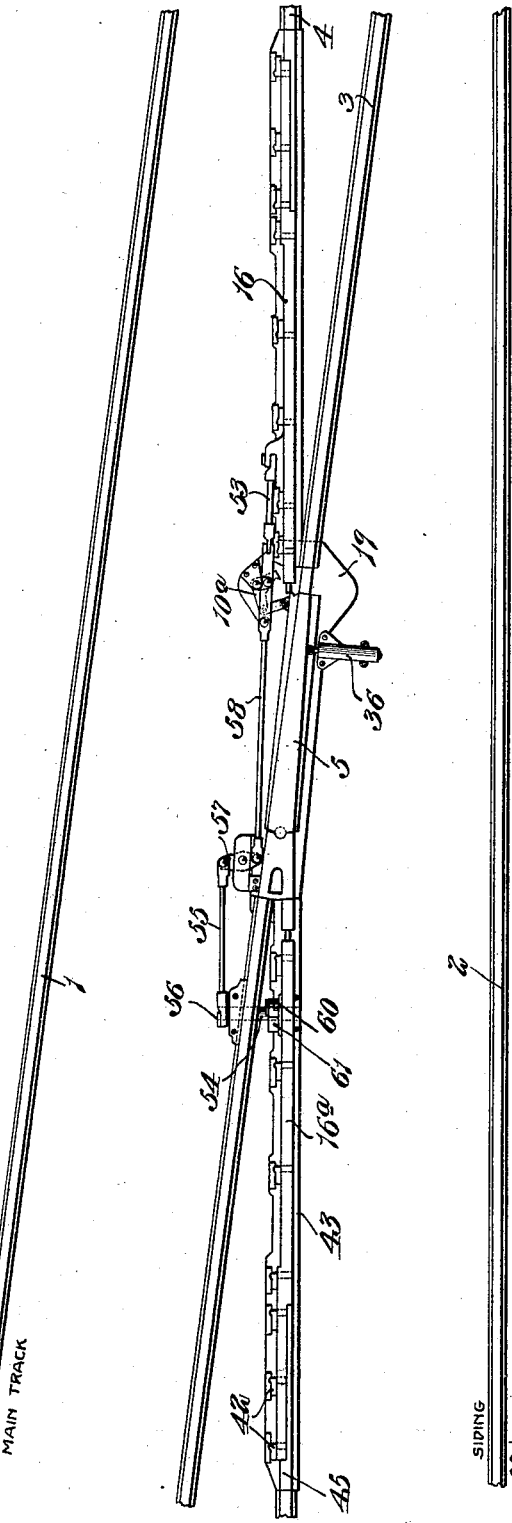

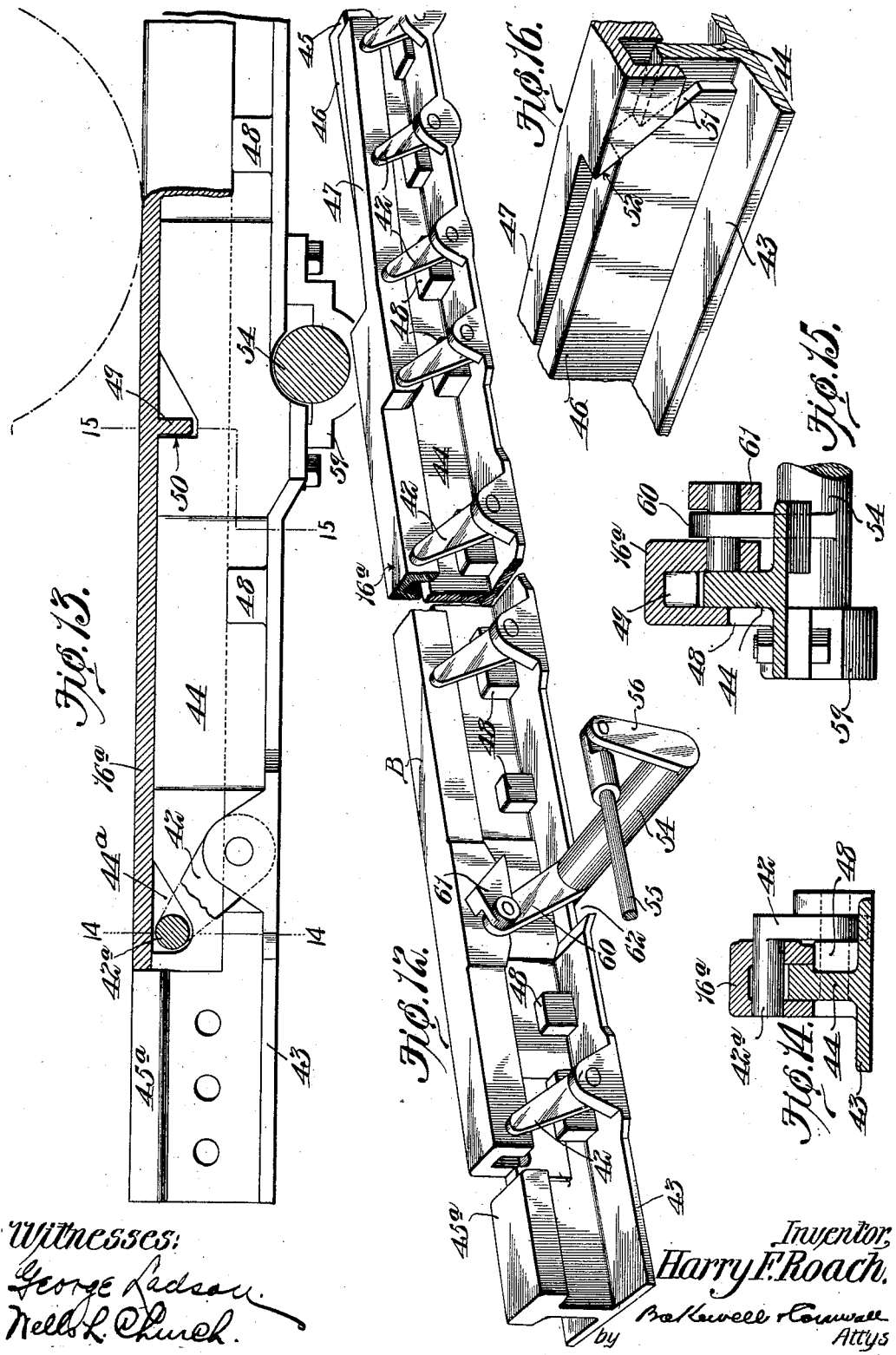

UNITED STATES PATENT OFFICE.

HARRY F. ROACH, OF ST. LOUIS, MISSOURI, ASSIGNOR TO CONTINUOUS RAIL & SAFETY SWITCH CO., OF ST. LOUIS, MISSOURI, A CORPORATION OF NEW JERSEY.

SWITCH-FROG.

No. 902,451.      Specification of Letters Patent.      Patented Oct. 27, 1908.

Application filed April 2, 1908. Serial No. 424,770.

*To all whom it may concern:*

Be it known that I, HARRY F. ROACH, a citizen of the United States, residing at St. Louis, Missouri, have invented a certain new and useful Improvement in Switch-Frogs, of which the following is a full, clear, and exact description, such as will enable others skilled in the art to which it appertains to make and use the same, reference being had to the accompanying drawings, forming part of this specification, in which—

Figure 1 is a diagrammatic view of a switch frog constructed in accordance with my invention and provided with a movable tongue that is operated by the means which moves the switch points; Fig. 2 is an enlarged cross sectional view of one of the rails and its coöperating wheel-operated member, said member being in its elevated position; Fig. 3 is a side elevation of one of the wheel-operated members that is employed for insuring a full movement of the tongue; Fig. 4 is an enlarged top plan view of the movable tongue and the mechanism employed for operating said tongue and locking it in adjusted position; Fig. 5 is a diagrammatic view illustrating one form of my invention in which wheel-operated members are employed for actuating the movable tongue and locking it in position; Fig. 6 is a side elevation of the wheel-operated member arranged in advance of the switch points and the mechanism that is employed for moving said member laterally into an inoperative position; Fig. 7 is an enlarged cross sectional view taken on the line 7—7 of Fig. 6; Fig. 8 is a diagrammatic view illustrating one form of my invention in which the movable tongue is normally held in alinement with the inside rail of the main track; Fig. 9 is an enlarged top plan view of the movable tongue shown in Fig. 8 and the mechanism which operates said tongue and locks it in adjusted position; Fig. 10 is an enlarged cross sectional view taken on the line 10—10 of Fig. 9; Fig. 11 is a longitudinal sectional view taken on the line 11—11 of Fig. 10; Fig. 12 is an enlarged perspective view of the wheel-operated member used in the construction illustrated in Fig. 8 and also the support on which said member is mounted; Fig. 13 is a side elevation of said support and wheel-operated member, a portion of said member being broken away to more clearly show the construction of the support; Fig. 14 is a cross sectional view taken on the line 14—14 of Fig. 13; Fig. 15 is a cross sectional view taken on the line 15—15 of Fig. 13; and Fig. 16 is a detail perspective view of a portion of the wheel-operated member shown in Fig. 12 and the support on which said member is mounted.

This invention relates to railway track structures, and particularly to frogs of that type in which a movable tongue or frog-point is arranged at the intersection of the inside rails of two intersecting tracks, such for example, as a main line and a siding.

One object of my invention is to provide a track structure of the type referred to comprising means for operating the movable frog-point or tongue, and novel means for locking said tongue in alinement with either of the inside rails with which it coöperates.

Another object of my invention is to provide means occupying an extended zone on each side of the frog-point and adapted to be operated by the wheels of a passing train for actuating said movable tongue.

Another object of my invention is to provide means adapted to be operated by the wheels of a passing train for actuating locking means which holds said movable tongue in adjusted position.

Another object of my invention is to provide a track structure comprising movable switch-points, a movable tongue or frog-point, and means for moving said tongue and locking it in position when the switch-points are shifted. And still another object is to provide a track structure comprising a movable element, and an operating member for said element which forms a portion of one of the rails of a track.

Other desirable features of my invention will be hereinafter pointed out.

Referring to Fig. 1 of the drawings which illustrates one form of my invention, 1 designates the outside rail of a main line or track, and 2 designates the outside rail of a side track, the inside rails 3 and 4 of said main track and siding, respectively, terminating in switch-points 3ª and 4ª. A pivotally mounted tongue or frog-point 5 is arranged at the intersection of the inside rails 3 and 4 so as to form continuations of said rails, and means is provided for moving said tongue when the switch-points are shifted, said means consisting of the following mechanism:

The switch-points are connected to an operating rod 6 and said rod is fastened to a pair of oppositely disposed bell crank levers 7 and 7ª to which rods 8 and 8ª are connected. The opposite ends of said rods are connected to oppositely disposed bell crank levers 9 and 9ª and said levers are connected to a pair of bell crank levers 10 and 10ª by means of links 11 and 11ª. These bell crank levers are connected to the free end of the movable tongue or frog-point 5 by means of links 12 and 12ª so that when the switch-point operating rod 6 is moved in the direction indicated by the arrow in Fig. 1 to close the siding and open the main line, the movable tongue 5 will be shifted from alinement with the inside rail 3 of the main line, as shown in said Fig. 1, into alinement with the inside rail 4 of the siding. Movement of the switch-operating rod in the opposite direction will, of course, shift the movable tongue 5 back into alinement with the inside rail 3 of the main line. The rod 6 can be operated manually or by electricity, compressed air or some suitable mechanical means under control of an operator in a switch tower located at some distance from the switch.

For locking the movable tongue 5 in either of its adjusted positions I have provided the bell crank levers 10 and 10ª with teeth or projections 13 that coöperate with recesses 14 in the free end of said movable tongue. These teeth or projections and their coöperating recesses are substantially V-shaped so that there will be no interference between the locking projection and the tongue 5 when the parts are moved. Another advantage of using V-shaped locking projections is that said projections tend to move the tongue to its extreme position when they pass into engagement with the inclined walls of their coöperating recesses. When the movable tongue 5 occupies the position shown in Fig. 4 the tooth or projection on bell crank lever 10ª will engage said tongue and lock it in this position, and when the switch-point operating rod 6 is moved to open the main line said tooth will pass out of engagement with its coöperating recess in the tongue 5 and thus release said tongue so that it can move into alinement with the inside rail 4 of the siding, the locking projection on bell crank lever 10 passing into engagement with the tongue 5 when it comes into alinement with the inside rail 4.

The mechanism just described constitutes a means operated by the switch-point actuating means for operating the movable tongue 5 and locking it in adjusted position, and in order that said tongue will be moved to its extreme position in case said switch-point actuating means should fail to move the tongue far enough to bring it into alinement with the proper rail, I have provided members 15 and 16 that are adapted to be moved by the wheels of a train traveling over the main track or siding, and means for transmitting the movements of said members to the movable tongue 5, said members also being adapted to operate the locking devices which retain the movable tongue in adjusted position. The members 15 and 16 are arranged adjacent the inside rails 3 and 4, respectively, of the main line and siding and occupy an extended zone between the switch-points and movable tongue 5 so that the said tongue will be locked in adjusted position some time before the wheels of the approaching train reach the frog.

The members 15 and 16 are supported by pivotally mounted or oscillating links 17 and the upper edges of said members normally lie in the same horizontal plane or a lower horizontal plane than the threads of the rails with which they coöperate, as shown in Fig. 3. When said members are moved longitudinally, however, the links 17 will assume an upright position and thus raise said members so that their upper edges will lie in a higher horizontal plane than the treads of the rails, thereby bringing said members into position to be operated on by the wheels of a passing train. If said members continue to move longitudinally in the same direction the links will swing into the position shown in broken lines in Fig. 3 and thus permit said members to descend so that their upper edges lie in the same horizontal plane as the treads of the rails. The ends of both the members 15 and 16 are deflected or bent downwardly, as shown in Fig. 3, so as to permit a wheel to pass onto same easily without a sudden shock or jar and said members are connected by links 18 and 18ª to the levers 10ª and 10, respectively, which constitute the locking devices for the movable tongue.

When the switch point operating rod 6 is moved in either direction the members 15 and 16 will move upwardly and if the tongue or frog-point 5 moves to its extreme position so that it alines with one of the inside rails 3 or 4 said members 15 and 16 will descend to their normal positions. If the tongue 5 should not move far enough, however, to carry it into alinement with one of the inside rails, the members 15 and 16, of course, would come to rest in an abnormal position; namely, with their upper edges above the treads of the rails. Consequently, if a wheel should travel over either of the inside rails in the direction of the arrow $a$ in Fig. 1, the member that is arranged alongside of the rail over which the wheel is traveling would be engaged by the tread of the wheel and thus be depressed and moved longitudinally towards the movable tongue 5, thereby imparting movement to said tongue 5 and bringing it into alinement with the inside rail on which the wheel is traveling.

As shown in Fig. 4, the movable tongue 5 is mounted on a base plate 19 secured to the ties of the track and the inner end or heel portion of said tongue is connected by a pivot 5ª to a block 20 on the base which butts against the ends of the rails that form continuations of the inside rails 3 and 4 of the main line and siding, said block 20 being preferably formed integral with the base plate and constituting a tread portion. Coöperating lugs on the tongue and base plate, as hereinafter described, form stops which limit the lateral movement of the tongue and also prevent the tongue from moving upwardly from the base plate. Instead of having the free end or toe end of the movable tongue 5 coöperate directly with the terminals of the inside rails 3 and 4, I prefer to have said tongue coöperate with tread sections 20ª formed integral with the base plate, the inside rails 3 and 4 being connected to said integral tread sections or to projections on said sections in any suitable manner. I also prefer to provide the toe end of the tongue with a wide base flange that insures a good substantial bearing for the tongue on the base plate, so that the tongue will not pound or move vertically when it is engaged by a wheel.

While I prefer to form the tread sections 20 and 20ª integral with the base plate 19 it will, of course, be obvious that said tread sections could be detachably connected to the base plate without departing from the spirit of my invention. The bell crank levers 10 and 10ª are pivotally connected to arms on brackets 21 secured to the base plate and the bell crank levers 9 and 9ª are pivotally connected to brackets on the underneath sides of plates 22 that are secured to the track ties, as shown in Fig. 4. Preferably, the rods or links 8 and 8ª are so constructed that they can be shortened or lengthened so as to be properly adjusted. In the form of my invention shown in Fig. 4, said rods are provided with screw-threaded ends that fit in screw-threaded openings in blocks or links 23 that are connected to the bell crank levers which said rods actuate.

Instead of operating the movable tongue 5 by the means that actuates the switch-points, as shown in Fig. 1, I can arrange wheel-operated members adjacent the inside rails of the main track and siding on each side of the frog and connect said members to the movable tongue 5 in such a manner that said tongue will be shifted automatically by the wheels of a train that approaches the frog on either the main line or siding and from either side of the frog. Such a construction is illustrated in Fig. 5 wherein it will be seen that members 15 and 16 are arranged adjacent the inside rails 3 and 4 on one side of the frog and members 15ª and 16ª are arranged adjacent the continuations of said inside rails on the other side of the frog, the members 15 and 15ª constituting a pair and the members 16 and 16ª constituting a pair. The members 15 and 16 are connected to the movable tongue or frog-point 5 by means of bell crank levers and links in the same manner illustrated in Fig. 1, and the members 15ª and 16ª on the opposite side of the frog are connected to the free ends of levers 24 and 25, respectively, that are connected to the bell crank levers 10 and 10ª by means of links 26 and 27, said links being fastened to the same arms of the bell crank levers 10 and 10ª that the members 15 and 16 are connected to.

In the construction shown in Fig. 5 the links 17 which support the wheel-operated members are so constructed that they cannot swing clear over on their pivots in the manner shown in Fig. 3. That is to say, in the construction shown in Fig. 5 the outer ends of the links 17 merely move up and down so as to rock the members thereon upwardly and then downwardly, the links being so arranged that the wheel-operated members which coöperate with the inside rail of the main line are depressed when the members that coöperate with the inside rail of the siding are elevated and vice versa. When the movable tongue 5 occupies the position shown in full lines in Fig. 5 so that it forms a continuation of the inside rail of the main line, both of the members 15 and 15ª will be depressed and both of the members 16 and 16ª will be elevated. If a train on the main line approaches the frog from either direction the movable tongue 5 will not move or shift for the pressure of the wheels on either of the members 15 or 15ª holds the bell crank lever 10ª in such a position that the frog-point is positively locked. If a train on the side track approaches the frog from the direction indicated by the arrow b in Fig. 5, the member 16ª will be depressed and moved longitudinally toward the movable tongue 5 and thus move the bell crank lever 10ª so that it shifts the tongue 5 into the position shown in broken lines in Fig. 5 wherein it forms a continuation of the inside rail 4 of the siding. As the tongue 5 moves into alinement with the inside rail 4 the members 15 and 15ª will be restored to their normal elevated position so that said members will be in position for operating said tongue when a train approaches the frog on the main line. I prefer to arrange a wheel-operated member 29 in advance of the switch-point of the inside rail 3 of the main line, as shown in Fig. 5, and connect said member to the wheel-operated member 15 by a link 30 so that the movable tongue 5 will be thrown to close the main line before the wheels of the approaching train reach the switch-points.

When a train is to be switched from the main line onto the siding or from the siding onto the main line, the rod 6, to which the switch-points 3ª and 4ª are connected, has to be operated, and in order that the movable tongue 5 will not be moved out of alinement with the inside rail 4 of the siding I have provided means for moving the wheel-operated member 29 laterally into an inoperative position whenever the switch-points are shifted to close the siding. The means shown in Fig. 5 for accomplishing this consists of an arm 6ª on the switch-point operating rod that has a loose connection with a bar 31 fastened to the inner ends of two pivotally mounted levers 32 that are connected at their outer ends to movable bearings 33 that carry the inclined links 17 which support the member 29. When the rod 6 is moved in the direction indicated by the arrow in Fig. 5 so as to close the siding, the levers 32 will be actuated and thus move the member 29 laterally into an inoperative position, as shown in broken lines in Fig. 5 so that it cannot be engaged by the wheels of the train that passes onto or off of the siding. The laterally movable bearings 33 are provided with shanks or arms 33ª that are supported by a bar 34 connected to brackets 35 on the underneath side of the rail alongside of which the member 29 is arranged, and each of said bearings is provided with a boss to which one of the levers 32 is pivotally connected, as shown in Figs. 6 and 7.

If desired, the operating mechanism for the movable tongue or frog-point 5 can consist of a spring which holds said tongue normally in alinement with the inside rail of the main line, and means either manually or automatically operated for moving the tongue into alinement with the inside rail of the siding. Such a construction is illustrated in Fig. 8 wherein the reference character 36 designates a housing that contains a spring which normally holds the tongue 5 in alinement with the inside rail 3 of the main line. Wheel-operated members 16 and 16ª are arranged adjacent the inside rails of the siding on each side of the frog and said members are connected by means hereinafter described to a bell crank lever 10ª that is connected by a link 12ª to the free end or toe end of the tongue 5, said bell crank lever being provided with a tooth or projection that coöperates with a recess in the end of the said tongue to lock it in alinement with the inside rail 4 of the siding. When a train traveling on the siding approaches the frog from either direction the members 16 and 16ª will be depressed and thus move the tongue 5 into alinement with the inside rail 4 of the siding and lock it in position. The tongue 5 is moved in the opposite direction into alinement with the inside rail 3 by the spring in the housing 36 so as to close the main line as soon as the wheels have passed out of engagement with the operating members 16 and 16ª, the return movement of said tongue restoring said operating members to their normal elevated position.

Referring to Fig. 9 which more clearly illustrates some features of the construction shown in Fig. 8, 37 designates an expansion spring that holds the movable tongue 5 in alinement with the inside rail of the main line, said spring being arranged inside of the housing 36 and interposed between an abutment on said housing and a head on the end of a plunger 37ª which is pivotally connected to the tongue 5. The movable tongue 5 slides on the base plate 19 and said tongue is provided intermediate its ends with a hollow chamber or recess 38, as shown in Fig. 10, the bottom of said chamber being open so that a stop 39 on the base plate can project upwardly into same. The upper edge and the ends of said stop 39 conform to the shape of the top 38ª and end walls 38ᵇ of said chamber so that a tight fit is insured between said parts, and the stop is provided with laterally projecting flanges 40 that coöperate with inwardly projecting lugs 41 on the side walls of said chamber. When the tongue 5 is moved laterally in either direction the air inside of the chamber 38 will form a cushion that absorbs the shock of said tongue as it arrives in position, and the laterally projecting flanges 40 on the stop 39 bear upon the inwardly projecting lugs 41 so as to hold the tongue 5 firmly upon the base plate and prevent it from tilting upwardly when a wheel strikes either end thereof.

As shown in Fig. 9, the tongue 5 is provided adjacent its free end with a second hollow chamber 38, and the base plate is provided with a second stop 39 that projects into said chamber so as to produce a controlling means for the extreme end of the tongue, the said stop being preferably provided with flanges that project underneath lugs on the inside of the chamber 38 when the tongue is in its extreme positions. As previously stated, the toe end of the tongue is provided with a wide base flange that insures a substantial bearing surface for the tongue on the base plate, and this wide flange also permits the hollow chamber 38 to be located adjacent the free end of the tongue, in view of the fact that the side walls of said chamber project laterally beyond the sides of the tongue, the base flange forming the bottom wall of said chamber.

While the stop 39 and the recess on the underneath side of the tongue coöperate with each other to form a cushioning device, the main function of said stop is to limit the lateral movement of the tongue in opposite directions. The stop also corresponds in length to the length of the recess or chamber 38 in the tongue, so that it prevents the tongue from creeping or moving longitudinally the base plate, and the coöperating lugs 40 and 41 on the tongue and base plate prevent the tongue from moving upwardly. A construction of this character absolutely prevents snow, ice, or any other foreign substance from interfering with the movements of the tongue for the means that controls or limits the movement of the tongue is completely inclosed in a recess or chamber on the underneath side of the tongue.

As the wheel-operated members 16 and 16ª, shown in Fig. 8, form one of the novel features of my invention, I have illustrated the details of construction of the member 16ª in Figs. 12 to 15, inclusive, the member 16 also being of the same construction. The member 16ª is mounted on links 42 pivotally connected at their lower ends to lugs on a stationary support, and said links are of such shape that a portion of the member 16ª will project above the tread of the inside rail with which said member coöperates when said links are in a substantially upright position, as shown in Fig. 12, thereby causing said member to be depressed and moved longitudinally in the direction of the arrow in said figure when it is engaged by a wheel that is approaching the frog.

It is obvious that the member 16ª might be guided in its movement by slots and in such a construction the links 42 would be dispensed with. The support for the member 16ª comprises a base 43 and a vertically disposed web 44 which for part of its length is provided with a rail head 45 conforming in cross section to the head on the inside rail against which it abuts, and a half head 46 forming a continuation of the rail head 45. The remaining portion of the web 44 is not provided with a head so that the support resembles a T-rail having its entire head removed for a portion of its length and half of its head removed from its adjacent portion. The member 16ª consists of an inverted channel-shaped portion or head B provided at one end with a straight shank 47 that is adapted to lie against one side of the vertical web 44 of the support and thus form a bearing surface that coöperates with the half head 46 to form a complete tread for a wheel, said inverted channel-shaped portion B embracing the portion of the web 44 of the support which is not provided with a head. The front end of the inverted channel-shaped head B butts against a rail head portion 45ª on the support when said head B is depressed, as shown in Fig. 13, so that a continuous tread will be provided for the wheel. The links 42 are provided at their upper ends with integral laterally projecting arms or trunnions 42ª that pass through openings in the member 16ª, and the vertical web 44 of the support is provided with cut-out portions 44ª, as shown in Fig. 13, to provide clearances for the trunnions 42ª that pass through the inverted channel-shaped head B. The base 43 of the support is provided with lugs or blocks 48 on which the lower edge of the member 16ª rests when said member is depressed, and the inverted channel-shaped head B of said member is provided with an internal cross rib 49 that butts against a shoulder 50 on the vertical web of the support when the member 16ª is depressed.

As shown in Fig. 16, the vertical web of the support is provided with an inclined bearing face 51 and the end of the inverted channel-shaped head B is provided with a coöperating inclined face 52 that rests upon the inclined face 51 when the member 16ª is depressed.

With a construction of this description there is no liability of the wheel-operated member becoming accidentally displaced for it is securely supported in both its elevated and depressed positions. Furthermore, as said member forms part of the tread of the rail on which the wheel travels there is no possibility of the wheel not engaging said member and thus failing to operate the movable tongue. Another advantage of this construction is that the wheel-operated member and its support can be built as a single unit and then shipped to the point where it is to be installed, the support being connected at one end to the inside rail with which it coöperates and at its opposite end to the base plate on which the movable tongue is mounted. The support can be formed from pressed steel, drop forgings, or cast metal, or said support can be produced by removing the entire head from a portion of the length of an ordinary rolled T-rail and removing half of the head from the adjacent portion of the rail.

The movements of the member 16 are imparted to the movable tongue 5 by means of a link 53 connected to the bell crank lever 10ª, and the movements of the member 16ª are imparted to said movable tongue by means of a rock shaft 54, a link 55 connected to an arm 56 on the outer end of said rock shaft, a lever 57 to which said link is fastened, and a link 58 leading from the opposite end of said lever 57 to the bell crank lever 10ª, as shown in Fig. 8. The rock shaft 54 is journaled in a bearing 59 on the underneath side of the base 43 of the support, and said shaft is provided with an integral arm 60 that is pivotally connected at its upper end to a bracket 61 on the member 16ª, the base of the support being cut away at 62, as shown in Fig. 12, to provide a clearance for the arm 60.

While I have herein described the wheel-operated member shown in Figs. 13 to 16, inclusive, as being used for operating the movable tongue of a switch-frog, it will, of course, be understood that it could be employed for operating other devices as for instance, a switch-tongue, without departing from the spirit of my invention, and therefore, the term "movable element" which appears in some of the claims should not be construed as being limited to a movable frog-point or tongue.

Having thus described my invention, what I claim as new and desire to secure by Letters Patent is:

1. In a switch frog, a base having rigid stop projections, a movable tongue mounted on said base and coöperating with said projections, means for moving said tongue, and horizontally disposed locking devices pivotally mounted on the base and adapted to engage said tongue to lock it in operative position; substantially as described.

2. In a switch frog, a base having rigid overhanging stop projections, a movable tongue mounted on said base and provided with a recess or chamber, lateral projections on said tongue arranged inside of said recess and adapted to extend underneath the overhanging projections on the base, means for moving said tongue, and means for locking said tongue in its different positions; substantially as described.

3. In a switch frog, a base having rigid overhanging stop projections, a tongue pivotally mounted on said base and having inclosed lugs which coöperate with said stop projections to lock said tongue against upward movement, means for moving said tongue, and locking devices adapted to engage said tongue and lock it against lateral movement; substantially as described.

4. In a switch frog, a base having integral projections to which the rail terminals are connected, said base also having a rigid stop projection, and a tongue pivotally mounted on said base and provided on its underneath side with a recess into which said rigid stop projection extends so as to limit the lateral movement of the tongue; substantially as described.

5. In a switch frog, a base, a movable tongue mounted on said base and provided on its underneath side with a chamber or recess, a stop extending up from said base into said recess for engaging said tongue in its different positions, and means for holding the tongue in engagement with said stop so as to lock the tongue in its different positions; substantially as described.

6. In a railway track structure, a movable tongue provided on its underneath side with a recess or chamber, and a rigid stop projecting into said chamber at all times to limit the lateral movements of the tongue and also prevent the tongue from creeping longitudinally; substantially as described.

7. A railway track structure provided with a movable tongue arranged at the intersection of the inside rails of two tracks, means for moving said tongue, and locking devices coöperating with recesses in the free end of said tongue for retaining it in its different positions; substantially as described.

8. The combination of a movable tongue, rail terminals, means for moving said tongue into coöperative relation to one or the other of said rail terminals, and horizontally disposed, pivotally mounted locking devices arranged on each side of said rail terminals for alternately engaging the free end of said tongue to lock the same in position; substantially as described.

9. The combination of a movable tongue, rail terminals with which said tongue coöperates, means for moving said tongue, and horizontally disposed, pivotally mounted locking devices arranged on each side of the rail terminals for alternately engaging the free end of the tongue, the actuating means for the tongue also coöperating with said locking devices; substantially as described.

10. In a railway track structure, a movable tongue provided on its underneath side with a recess or chamber, a base plate on which said tongue is mounted, a rigid stop on said base plate projecting into said recess and corresponding in length to the length of said recess, and coöperating means on said stop and tongue to prevent the tongue from moving upwardly off the base plate; substantially as described.

11. In a switch frog, main line and siding rails, a base plate, a tongue pivotally mounted on said base plate, depressible wheel-operated members arranged adjacent the inside rails of the main line and siding for operating said tongue, and movable devices operatively connected to said wheel-operated members for engaging the tongue to lock it in its different positions; substantially as described.

12. In a switch frog, a base plate, main line and siding rails, depressible wheel-operated members arranged adjacent said rails, connections between said wheel-operated members and said tongue whereby the tongue is thrown when one of said members is actuated, and pivotally mounted locking devices actuated by said wheel-operated members for engaging said tongue to lock it in its different positions; substantially as described.

13. In a switch frog, a base plate, a tongue pivotally mounted on said base plate, main line rails and siding rails connected to the base plate, depressible wheel-operated members arranged adjacent said rails, means for connecting the main rail depressible member at the toe end of the tongue with the main rail depressible member at the heel end of the tongue, means for connecting the siding rail depressible member at the toe end of the tongue with the siding rail depressible member at the heel end of the tongue, so that when the pair of wheel-operated members which coöperate with the main rail is depressed the tongue will be moved to open the main line, and the pair of wheel-operated members which coöperate with the siding rail will be elevated in readiness to operate the tongue to open the siding when a train enters the siding, and locking devices actuated by said wheel-operated members for engaging the tongue to lock it in its different positions; substantially as described.

14. In a switch frog, a movable tongue arranged at the intersection of the inside rails of the main line and a siding, wheel-operated means for moving said tongue, and a switch-operating bar for moving said wheel-operated means to render it inoperative; substantially as described.

15. In a switch frog, a tongue arranged at the intersection of the inside rails of the main line and siding, wheel-operated means for moving said tongue, a switch-operating bar, and a connection between said bar and said wheel-operated means whereby said wheel-operated means is moved to render it operative and inoperative according to the position of said switch-operating bar; substantially as described.

16. In a switch frog, a base plate, a movable tongue mounted on said base plate and provided at its toe end with a wide laterally projecting base flange, and tread extensions cast integral with said plate and forming terminals to which the rails of two intersecting tracks are connected; substantially as described.

17. In a switch-frog, a base, a tongue pivotally mounted on said base, tread extensions cast integral with said base, and integral projections on said tread extensions to which the webs of the main and siding rails may be connected; substantially as described.

18. The combination of the inner rails constituting the frog crossing of the main track and its siding, a pivotally mounted frog tongue at said crossing, and means operable by the wheels of a passing train for operating said frog tongue, said means occupying an extended zone along said inner rails on each side of the frog crossing so that the frog tongue will be thrown some time before the wheels of the approaching train reach same; substantially as described.

19. The combination with the rails constituting a crossing, a pivotally mounted movable element for making the crossing rails continuous, and means for appropriately operating said movable element, said means occupying an extended zone on each side of the crossing rails so that the movable element will be thrown some time before the wheels of the approaching train reach same; substantially as described.

20. In a railway track structure, a movable tongue provided adjacent its toe end with a notch or recess, a locking device pivotally connected intermediate its ends to a stationary support and having a tooth which is adapted to enter the notch in said tongue to lock the same in position, and means connected to the other end of said locking device for operating it; substantially as described.

21. In a switch frog, a tongue pivotally connected to a suitable support, switch points operatively connected to said tongue, and horizontally disposed pivotally mounted locking devices adapted to engage the free end of said tongue and lock it in position, said locking devices being operatively connected to said switch points; substantially as described.

22. In a switch frog, a base plate having rail terminals secured thereto, a tongue pivotally mounted on said base plate, locking devices coöperating with the free end of said tongue to lock it in its different positions, and means operated by the wheels of a passing train for holding said locking devices in engagement with said tongue; substantially as described.

23. In a switch-frog, a base plate to which the terminals of rails are connected, a movable tongue pivotally mounted on said base plate, a switch-operating rod connected to said movable tongue, means for locking said tongue in its different positions, said means being operable by said switch-operating means, and train operated means also coöperating with said locking devices to hold them in operative position; substantially as described.

24. In a switch-frog, a base, a tongue pivotally mounted on said base, devices pivotally connected to said base and adapted to engage said tongue for locking it in position, and a switch-operating means for actuating said tongue and also connected to said locking devices so as to actuate same; substantially as described.

25. In a switch-frog, a base plate, a tongue pivotally mounted on said base plate, alternately operable locking devices for coöperating with said tongue, switch-operating mechanism for operating said locking devices, and means operable by a passing train for actuating said locking devices; substantially as described.

26. In a switch-frog, main and siding rails, a base plate, a tongue pivotally mounted on said base plate, locking devices mounted on said base plate and adapted to engage said tongue, depressible members for coöperating with said locking devices to hold them in engagement with said tongue, and links for supporting said depressible members in position; substantially as described.

27. In a switch-frog, main and siding rails, a base plate, a tongue pivotally mounted on said base plate, a switch-operating member for operating said tongue, locking devices adapted to engage said tongue and lock it, and depressible members coöperating with said locking devices; substantially as described.

28. In a switch-frog, a base plate, a tongue pivotally mounted on said base plate, means for operating said tongue, locking devices for engaging said tongue, which locking devices are operated by mechanism which operates the tongue, and depressible members operable by a passing train so as to actuate said locking devices and hold them in locking position; substantially as described.

29. The combination of a main track, a siding track, a switch, a movable frog tongue, means connecting the switch and the movable frog tongue for operating the latter when the former is thrown, and wheel operated members occupying a zone extending substantially between the switch and the frog and arranged adjacent the inside rails of the tracks, for preventing the switch and frog from being inappropriately operated; substantially as described.

30. The combination with a main track, a siding track, a switch, a movable frog tongue, movable locking devices for engaging said tongue, and means operatively connected to said locking devices, and occupying an extended zone between the switch and the frog, said means being operable by the wheels of a train for holding the frog point in its proper position and preventing movement thereof during the presence of a wheel in said zone; substantially as described.

31. The combination of a main track, a siding track, a switch, a movable frog tongue, means for connectively moving said switch and frog tongue, pivotally mounted locking devices for said frog tongue, and means operatively connected to said locking devices and occupying an extended zone between the switch and the frog tongue for operating said locking devices and preventing their withdrawal during the presence of a train wheel in said zone; substantially as described.

32. The combination of a main track, a siding track, a switch, a movable frog tongue, means for connectively moving said switch and frog tongue, locking devices coöperating with the frog tongue, and wheel-operated means arranged alongside of the inner converging rails throughout an extended zone between the switch and the frog tongue, for forcing the locking devices home so as to prevent the throw of the switch or the frog tongue when a train wheel is in said zone; substantially as described.

33. In a switch-frog, a base plate, a tongue pivotally mounted on said base plate, a switch, a connection between said switch and said tongue whereby the latter is moved when the switch is thrown, and wheel-operated members occupying an extended zone between the switch and the tongue for preventing the movement of said switch and tongue when any wheel of the train is in said zone; substantially as described.

34. In a switch frog, main line and siding rails, a base plate, a tongue pivotally mounted on said base plate, devices for locking said tongue in its different positions, depressible members arranged along the side of the inner converging rails between the switch and the tongue and adapted to be operated by a passing train to force said tongue home, and means for transmitting the movements of said depressible members to said locking devices; substantially as described.

35. In a switch frog, a base plate, a tongue pivotally mounted on said base plate, devices for locking said tongue in its extreme positions, means in the form of depressible members arranged along the side of the inner converging rails and extending throughout the entire length of said rails from the switch to the frog for preventing inappropriate movement of said tongue and withdrawal of said locking devices, said depressible members being designed to be operated by a train either on the main line or siding, and a switch-operating bar operatively connected to said tongue and locking devices for operating same when said bar is moved to open or close the switch; substantially as described.

36. The combination of a rail, a depressible member arranged in longitudinal alinement therewith and normally lying in an approximately horizontal plane, means for yieldingly holding said depressible member in an elevated position, a movable element, and means for transmitting the movement of said depressible member to said movable element; substantially as described.

37. The combination of a movable element, a depressible member adapted to operate said element and provided with a horizontally disposed portion which forms a continuation of the track rail and is arranged in longitudinal alinement therewith, and a mechanical connection between said movable element and said depressible member; substantially as described.

38. The combination of a rail, a movable element, a support arranged in longitudinal alinement with said rail, and a depressible actuating member extending longitudinally of said support and having a portion that projects over said support to form a tread surface for a wheel; substantially as described.

39. The combination of a support having a head portion which conforms in cross section to the head of a track rail and forms a continuation thereof, and a depressible actuating member arranged longitudinally of said support and forming a continuation of the head of the track rail; substantially as described.

40. The combination of a support arranged in longitudinal alinement with a track rail, and a depressible actuating member having a portion which embraces said support and forms a tread surface for a wheel that is traveling on the track; substantially as described.

41. The combination of a support arranged in longitudinal alinement with one of the track rails and having a base and a vertically disposed web, and a depressible actuating member arranged longitudinally of said support and having a portion that embraces the web thereof to form a tread surface for a wheel; substantially as described.

42. The combination of a support arranged in longitudinal alinement with one of the track rails and having a base and a vertically disposed web, a depressible actuating member arranged longitudinally of said support and having a portion that embraces the web thereof to form a tread surface for a wheel, and means on the base of said support for sustaining said member when it is depressed; substantially as described.

43. The combination of a support having a base and a web which for a portion of its length is provided with a head that forms a tread for a wheel, and a depressible actuating member having a head that projects over the web of the base and forms a continuation of the head thereon; substantially as described.

44. The combination of a support having a base and a vertically disposed web provided with a portion that forms part of a tread surface, and a depressible actuating member arranged longitudinally of said support and forming the other portion of said tread surface; substantially as described.

45. The combination of a support having a vertically disposed web provided for a portion of its length with a rail head and for a portion of its length with a half head, and a depressible actuating member having a shank that coöperates with the half head on the support to form a tread surface, and a head that embraces the web of said support to form a continuation of the tread faces thereon; substantially as described.

46. A device for the purpose described, comprising a support in longitudinal alinement with a track rail, a member adapted to move longitudinally of said support, and means for preventing said member from moving laterally relatively to the support; substantially as described.

47. A device for the purpose described, comprising a support, in longitudinal alinement with a track rail, a depressible member arranged longitudinally of said support and normally elevated therefrom, and means on the support which forms a bearing surface for said member when it is depressed; substantially as described.

48. A device for the purpose described, comprising a support in longitudinal alinement with a track rail, a member arranged longitudinally of said support, links which normally sustain said member in an elevated position, and means for preventing said member from moving laterally relatively to the support; substantially as described.

49. A device for the purpose described, comprising a support in longitudinal alinement with a track rail, a depressible member arranged longitudinally of the support and held normally in an elevated position by means of pivotally mounted arms or links, means for preventing said member from moving laterally relatively to the support, and bearing surfaces on the support which said member engages when it is in its depressed position; substantially as described.

50. A device for the purpose described, comprising a support of approximately inverted T-shape in cross section, and a depressible member arranged longitudinally of said support and having a head portion of inverted channel-shape in cross section that embraces the web of said support; substantially as described.

51. A device for the purpose described, comprising a support having a vertically disposed web provided with an inclined bearing surface, a depressible actuating member having a shank that extends longitudinally of said web and a head of approximately inverted channel-shape that embraces said web, and inclined bearing faces on said head which are adapted to engage the inclined bearing surface on the web of the support when said actuating member is in its elevated and depressed positions; substantially as described.

52. In combination with an actuating member, of a support for the actuating member consisting of a base, and a vertically disposed web provided for a portion of its length with a rail head and having a half head on its adjacent portion; substantially as described.

53. A support for the actuating member of a switch-frog consisting of a base and a vertically disposed web provided for a portion of its length with a rail head and having a half head on its adjacent portion, an actuating member, and blocks on the base of said support to form bearing surfaces for said actuating member; substantially as described.

54. An actuating member provided with a shank that is adapted to extend longitudinally of a support and form a tread surface for a wheel, and a head on said shank which is adapted to embrace the support to form a continuation of said tread surface; substantially as described.

55. In a device of the character described, the combination with a movable element, of a rigid train-operated actuating member mechanically connected to said movable element, said actuating member extending in longitudinal alinement with a track rail and normally lying in a horizontal plane above the plane of said track rail whereby any wheel of a passing train will hold said actuating member depressed while said wheel is in the zone of said member; substantially as described.

56. In a device of the character described, the combination with an element to be operated by a passing train, and an actuating member for said element, said actuating member consisting of a single rigid device that forms a continuation of one of the track rails; substantially as described.

57. In a device of the character described, the combination of an element to be moved, and a one-piece actuating member for moving said element, said actuating member being provided with a tread portion for supporting the wheels of a passing train, which tread portion normally lies in an approximately horizontal plane above the plane of the tread portion of its track rail, a support on which said actuating member rests when it is depressed, and means for elevating said actuating member after the passage of a train thereover; substantially as described.

58. A railway track structure comprising rails which form a main track and a siding, a movable tongue arranged at the intersection of the inside rails of said tracks, movable switch points, means for causing said tongue to move into alinement with one of said inside rails when the switch points are operated, wheel-operated members arranged adjacent the inside rails of the main track and siding and adapted to move longitudinally for actuating said tongue, and means for causing said wheel-operated members to assume an operative position in case said tongue is not in alinement with either of said inside rails; substantially as described.

59. In a switch frog, a movable tongue, switch-operating means for actuating said tongue, wheel-operated members arranged adjacent the inside rails of the main line and siding and adapted to move longitudinally for actuating said tongue in case the switch-operating means fails to move it to its extreme position, said wheel-operated members normally occupying an inoperative position, and means for causing said members to assume an operative position whenever the movable tongue is in an inoperative position; substantially as described.

60. In a switch frog, a movable tongue, means for operating said tongue, and bell-cranked-shaped locking devices having teeth that are adapted to engage said tongue and lock it in operative position; substantially as described.

61. In a switch-frog, a movable tongue, switch-operating means for actuating said tongue, wheel-operated members adapted to actuate said tongue, and pivotally mounted locking devices operated by both of said actuating means and adapted to engage said tongue and lock it in an operative position; substantially as described.

62. In a switch-frog, a movable tongue, mechanism for operating said tongue, and pivotally mounted bell crank levers operated by said mechanism and provided with teeth or projections which engage said tongue and lock it in an operative position; substantially as described.

63. In a railway track structure, a movable tongue adapted to form a continuation of the rails of two intersecting tracks, a support on which said tongue moves, means for actuating said tongue, and coöperating means on said tongue and support which form an air cushioning device that prevents the tongue from receiving a sudden shock or jar when it arrives in either of its operative positions; substantially as described.

64. In a railway track structure, a movable tongue adapted to form a continuation of the inside rails of two intersecting tracks, a base plate on which said tongue is slidingly mounted, a chamber or recess formed in the underneath side of said tongue, and a rigid stop on the base plate projecting into said chamber at all times for limiting the lateral movement of the tongue; substantially as described.

65. In a railway track structure, a movable tongue adapted to form a continuation of the inside rails of two intersecting tracks, a base plate on which said tongue is slidingly mounted, a chamber or recess formed in the underneath side of said tongue, a stop on the base plate projecting into said chamber, and coöperating lugs on said stop and tongue for preventing the tongue from moving upwardly off the base plate and for limiting the lateral movement of the tongue; substantially as described.

66. A device for the purpose described, comprising a support, a depressible actuating member arranged longitudinally of said support and adapted to contact with the support when it is depressed, and coöperating means on said member and support for limiting the longitudinal movement of said depressible member; substantially as described.

67. A device for the purpose described, comprising a support having a base and a vertically disposed web which for a portion of its length is provided with a rail head, a depressible actuating member having an inverted channel-shaped head that embraces the web on said support and which butts against the rail head on said web when said actuating member is depressed, and links pivotally connected at their lower ends to lugs on the base of the support for carrying said actuating member; substantially as described.

68. A device for the purpose described, comprising a support having a vertically disposed web, a depressible actuating member arranged longitudinally of said support, and an inclined bearing surface on said member which engages an inclined bearing surface on the web of said support when the actuating member is in either its elevated or depressed position; substantially as described.

69. In a switch frog, a base plate, a movable tongue mounted on said base plate and provided adjacent its toe end with a wide base flange, a chamber formed in said tongue adjacent its toe end, said flange forming the bottom wall of said chamber, and a rigid stop on the base plate projecting into said chamber; substantially as described.

In testimony whereof I hereunto affix my signature in the presence of two witnesses, this thirty-first day of March 1908.

HARRY F. ROACH.

Witnesses:
WELLS L. CHURCH,
GEORGE BAKEWELL.